(12) United States Patent
Fontdecaba Buj

(10) Patent No.: US 7,658,393 B2
(45) Date of Patent: Feb. 9, 2010

(54) COMPLEMENTARY SUSPENSION DEVICE

(75) Inventor: Josep Fontdecaba Buj, La Palma de Cervello (ES)

(73) Assignee: Creuat S.L., Molins de Rei (ES)

( * ) Notice: Subject to any disclaimer, the term of this patent is extended or adjusted under 35 U.S.C. 154(b) by 371 days.

(21) Appl. No.: 10/556,433

(22) PCT Filed: May 7, 2004

(86) PCT No.: PCT/EP2004/004885

§ 371 (c)(1),
(2), (4) Date: Jul. 13, 2006

(87) PCT Pub. No.: WO2004/098920

PCT Pub. Date: Nov. 18, 2004

(65) Prior Publication Data

US 2007/0138756 A1    Jun. 21, 2007

(30) Foreign Application Priority Data

May 9, 2003    (ES) ................................ 200301056

(51) Int. Cl.
*B60G 11/26* (2006.01)
*B60G 15/12* (2006.01)

(52) U.S. Cl. .................... 280/124.16; 280/124.157; 280/124.158; 280/124.159; 280/124.167; 280/5.507

(58) Field of Classification Search .......... 280/124.157, 280/124.158, 124.159, 124.16, 124.161, 280/5.507

See application file for complete search history.

(56) References Cited

U.S. PATENT DOCUMENTS

| 3,032,349 A | 5/1962 | Fiala |
| 3,068,023 A | 12/1962 | Fiala |
| 6,556,907 B1 | 4/2003 | Sakai |

FOREIGN PATENT DOCUMENTS

| DE | 40 03 493 | 8/1991 |
| DE | 94 15 009 | 1/1996 |
| EP | 116 610 | 7/2001 |
| EP | 1 213 164 | 6/2002 |
| GB | 932 832 | 7/1963 |
| WO | WO 03/022605 | 3/2003 |

*Primary Examiner*—Paul N. Dickson
*Assistant Examiner*—Barry Gooden, Jr.
(74) *Attorney, Agent, or Firm*—Sughrue Mion, PLLC

(57) ABSTRACT

Complementary suspension device applicable between the hydro-pneumatic suspension systems of at least two wheels of a vehicle, which transfer the forces originating in said wheels to the aforementioned complementary device by means of displacement, and/or decanting, of the fluids of said suspension systems through the corresponding conduits, said device comprising two fluid distribution units connected in parallel by means of each joint conduit, between the hydro-pneumatic suspension systems of at least one pair of vehicle wheels, in such a way that for each pair of wheels the first distribution unit is capable of allowing the intake of fluid through the joint conduit with the suspension system of one of the wheels and, at the same time, lets fluid exit through the joint conduit with the suspension system of the other wheel, whereas the second unit only allows the intake of fluid through the joint conduits with the two suspension systems at the same time.

19 Claims, 10 Drawing Sheets

COMPLEMENTARY SUSPENSION DEVICE

This application is a 371 of PCT/EP2004/004885, filed May 7, 2004; the disclosure of which is incorporated herein by reference.

TECHNICAL FIELD OF THE INVENTION

The invention relates to a complementary suspension device, particularly applicable to hydro-pneumatic suspensions for vehicles, of the type which receives the force originating from at least one pair of wheels, through separate fluid conduits and which transmits them selectively between the vehicle wheels. The invention also relates to a system that incorporates said device.

BACKGROUND OF THE INVENTION

At present, different central suspension devices are known which are applied to rolling vehicles wherein some or all of the vehicle wheels are provided with suspension devices that convert the vertical movement of the wheels into fluid displacement, commonly by the use of simple or double effect conventional hydraulic cylinders. The vertical movements in the vehicle wheels may be due to the unevenness of the ground on which the vehicle is travelling, to the acceleration to which it is subject or to the changes in direction which the vehicle makes when it is going at a certain speed.

Through the fluid conduits, the central devices in question receive the resulting pressure variations of the individual vertical movements of the vehicle wheels. The fluid conduits which come from different wheels are interconnected through fluid shock absorber devices, in such a way that the fluid displacement resulting from the vertical movement of one of the vehicle wheels may be conditional on the fluid displacement of another of the vehicle wheels. Thus, the vehicles are provided with suspension devices that are more or less favourable to bodywork movements involving more than one rolling element or wheel. In the pitching movements of a four-wheeled vehicle, for example, the two front or rear wheels undergo, at the same time, a positive vertical displacement which produces a dipping in the bodywork, which in extreme situations may affect the passenger's comfort and the vehicle's braking capacity, due to the decompensated distribution of the weight of the vehicle on the wheels.

In this case, central devices can avoid a positive displacement occurring and, in turn, on the two front or rear wheels of the vehicle, thus avoiding the excessive dipping of the bodywork and that most of the vehicle's weight is borne by the front wheels.

Therefore, a vehicle's stability is strongly related to the different oscillations that the vehicle body undergoes throughout its ride, which, besides the previously described dipping movements, includes the rocking movements, crossed axles, rotation as regards a vertical axis like rebound (when movements in the same direction occur in all the wheels supporting the vehicle).

In spite of the central devices' response, each of the vehicle wheels should be provided with elastic and individual cushioning means, capable of absorbing the wheel's small vertical movements, such as small potholes or unevenness in the ground, without transferring any movement to the vehicle's other wheels. To date, elastic springs or hydro-pneumatic cavities (hydrospheres) have been used for such purpose. Whereas the first group only works satisfactorily within a very restricted range of dynamic, static and load application situations, thus reducing the wheels' traction capability in the remaining situations, the second group displays a better performance.

The patent document PCT/ES02/00419 discloses a hydraulic suspension device (FIG. 10) between two wheels R1 and R2 made up of two simple-effect hydraulic cylinders 70, 71, connected between the chassis and the wheels wherein the piston 80 and 81 defines an upper cavity 76 and 77 so that the latter undergoes variations in its volume proportional to the movements of each wheel and a double piston device 41 transversally connected to each cylinder through the hydraulic conduits which are connected to the intermediate cavities and of a lesser diameter than the double piston device.

Each cylinder assembled between the vehicle body and the wheels has a hydro-pneumatic cavity 82, 83 which is connected to the cylinder 76, 77 cavity, or to the conduit that joins the latter to the device, providing each wheel with its own elastic component.

The cavity at the end with the greater diameter of the double piston 41 is connected to pneumatic expansion cavity 84 which provides elasticity to the combined movement of both wheels (pitching movement if the latter were the two front wheels of a motor vehicle) whereas it performs rigidly on the reverse movement of both wheels, said movement being limited to the elasticity provided by each of the individual expansion chambers of each wheel.

The hydro-pneumatic cavities usually employed are fitted with a restrictor valve 85 which cushions the flow oscillations of the circuit and uses up part of the energy delivered to or extracted from the compression of a gas 86 stored in its interior and enclosed in an elastic membrane 87.

In spite of the smooth running of the hydro-pneumatic chambers, the membranes 87 which store the gas 86 that the elastic component of the device provides when it compresses or expands undergo a very marked deterioration with the passing of time due to the knocks and friction it bears with the walls of the area surrounding it or with the restrictor valve. The excessive wear and tear of the membrane causes the splitting thereof and a total failure in the performance of the hydro-pneumatic cavity, the individual elastic component of the vehicle wheels being completely lost and therefore a decrease of the control thereof.

Therefore, the absence of a device is felt, which provides the vehicle wheels with an unrestricted movement, without using hydro-pneumatic chambers, and at the same time minimizes lateral oscillation movements, pitching, crossed axles and rocking and which is of a relatively simple construction.

EXPLANATION OF THE INVENTION

The complementary suspension device object of the invention is applicable between the hydro-pneumatic suspension systems of at least two wheels of a vehicle, which transfer the forces originating in said wheels to the aforementioned complementary device by means of displacement, and/or decanting, of the fluids of said suspension systems through the corresponding conduits.

In its essence, the complementary suspension device is characterised in that it comprises two fluid distribution units connected in parallel by means of different joint conduits, between the suspension systems of at least two wheels of the vehicle, the first unit being capable of allowing the intake of fluid through the joint conduit with one of the suspension systems and, at the same time, lets fluid exit through the joint conduit with the other suspension system, whereas the second unit only allows the intake of fluid through the joint conduits with the two suspension systems at the same time.

According to a preferred embodiment, the first distribution unit comprises a restrictor valve adapted to allow fluid to pass through it.

According to another preferred embodiment, the first distribution unit comprises two restrictor valves connected in series, between which a conduit is arranged, which establishes communication of fluid with the second distribution unit.

According to another characteristic of the invention, the quantity of fluid which penetrates the first distribution unit through the joint conduit or conduits to the suspension systems, is equal to the quantity of fluid which exits the aforementioned first distribution unit through the conduit or the joint conduits with the remaining suspension systems.

In a preferred embodiment, the first distribution unit comprises at least four chambers, each of the chambers of said first distribution unit being separate, without direct communication of fluid between them and of variable volume proportional to the stroke of at least one piston, all the pistons of which the distribution unit is provided being arranged integral to a connecting rod thereof, in such a way that they displace simultaneously, so that when a positive pressure variation occurs, equivalent and in the joint conduits with the suspension systems, at the same time, the connecting rod remains motionless when the pressure exerted on the piston or pistons of the two chambers to those which the joint conduits are connected with the two suspension systems is compensated, the distribution unit behaving rigidly to the combined flow and elastically to any other case due to the force response exerted by elastic means that act on at least one piston of the distribution unit.

In an embodiment of the device, the first distribution unit consists of a hydraulic cylinder that has two outer walls and is divided by a third fixed central wall that determines two compartments, the moveable rod being arranged axially inside the cylinder and fitted with two pistons situated respectively in one of the compartments, delimiting two chambers in each of the compartments, the two outer pistons being in connection with the elastic means and the two inner chambers connected to the joint conduits with the two suspension systems.

According to another preferred embodiment, the second distribution unit comprises at least three chambers, each of the chambers of said second distribution unit being separate, without direct communication of fluid between them and of variable volume proportional to the stroke of at least one piston, all the pistons with which the second distribution unit is provided being arranged integral to a connecting rod thereof, in such a way that they displace simultaneously, so that when a positive pressure variation occurs in the joint conduits with the two suspension systems at the same time, it causes an increase in volume in both chambers which is always in the same direction, the distribution unit behaving elastically to the combined flow and due to the response force exerted by elastic means on at least one piston of the distribution unit, whereas it remains motionless to the opposing flow.

In a preferred embodiment, the second distribution unit is made up of two coaxial cylinders of different diameter, connected to each other and closed at their ends, within which two pistons are arranged, integral to a rod thereof, respectively situated in the interior of the cylinders, delimiting three chambers in the distribution unit, the piston of the chamber with the greater diameter being in connection with elastic means and the two remaining chambers connected, respectively, to the joint conduits with the two suspension systems.

In another preferred embodiment, two suspension devices of a second pair of wheels are connected to the first distribution unit by means of respective joint conduits, the first distribution unit being made up of a hydraulic cylinder that has two outer walls and two fixed inner walls that determine three compartments, a rod being arranged and moveable axially in the interior of the cylinder and fitted with three pistons situated respectively in one of the compartments, delimiting two chambers in each of them, the two outermost pistons being in connection with the elastic means and the four inner chambers connected to the joint conduits with the respective suspension systems, so that, when an equivalent positive pressure variation occurs and in both branches at the same time as a same pair of wheels, the rod remains motionless when the pressure exerted on the pistons of the two chambers to which the joint conduits are connected with the two suspension systems is compensated, the first distribution unit behaving rigidly to the combined flow and elastically when the positive variation pressure comes from the suspension systems of non-matching wheels.

According to another embodiment of the device, two suspension devices of a second pair of wheels are connected to the second distribution unit by respective joint conduits, said second distribution unit being made up of a hydraulic cylinder that has two outer walls and two central inner walls that determine three compartments, a rod being arranged and moveable axially in the interior of the cylinder and fitted with three pistons situated respectively in one of the compartments, delimiting two chambers in each of them, the two outermost pistons being in connection with the elastic means and the four inner chambers connected to the joint conduits with the suspension systems of the wheels, so that, when a positive pressure variation occurs in the joint conduits with the suspension systems of the non-matching wheels, the rod remains motionless when the pressure exerted on the corresponding chambers is compensated, the second distribution unit behaving rigidly to said combined flow and elastically when the positive pressure variation comes from the joint conduits with the suspension systems of matching wheels.

In a preferred embodiment, the elastic means comprise pressurised gas or hydraulic fluid stored in hydro-pneumatic chambers.

In accordance with another characteristic of the invention, a multiple variation of the complementary suspension device also comprises two fluid distribution units analogous to the first and second distribution units, respectively, one of them being connected in series to the first unit, whereas the other is connected in series to the second unit.

Preferably, the analogous distribution unit connected in series with the first distribution unit is analogous to the second distribution unit, and the analogous distribution unit connected in series with the second distribution unit is analogous to the first distribution unit.

A complementary suspension system is also an object of the invention that is applicable to a four-wheeled vehicle, each of the wheels being provided with a hydro-pneumatic suspension system which transfers the forces originating in said wheels to the aforementioned complementary suspension system by displacement, and/or decanting, of the fluids of said suspension systems through corresponding conduits.

It is characteristic in the system that comprises a multiple complementary suspension device, according to the prior embodiments of the invention, connected between a pair of vehicle wheels, the joint conduits also being between two distribution units of a same branch connected respectively to the hydro-pneumatic system of one of the two remaining vehicle wheels.

According to another characteristic of the system of the invention, the hydro-pneumatic system of the two other wheels are also connected hydraulically.

In accordance with another characteristic of the complementary suspension system, the hydro-pneumatic suspension systems of the two other wheels are connected hydraulically by an analogous distribution unit to the first distribution unit.

In a preferred embodiment, the hydro-pneumatic suspension systems of the two other wheels are connected hydraulically by an analogous distribution unit to the second distribution unit.

In another preferred embodiment, the hydro-pneumatic suspension systems of the two other wheels are connected hydraulically by a simple complementary suspension device according to the invention.

According to another characteristic of the invention, the system also comprises a simple variant of the complementary suspension device according to the invention connected between the hydro-pneumatic suspension systems of the same pair of wheels of the vehicle connected by the multiple variant of the complementary suspension device.

In accordance with another characteristic of the invention, the complementary suspension system is characterised in that the multiple complementary suspension device is connected between two transversally opposite wheels of the vehicle.

BRIEF DESCRIPTION OF THE DRAWINGS

Different embodiments of the complementary suspension device object of the invention are illustrated in the attached drawings. In said drawings.

DETAILED DESCRIPTION OF THE DRAWINGS

Figure 1:
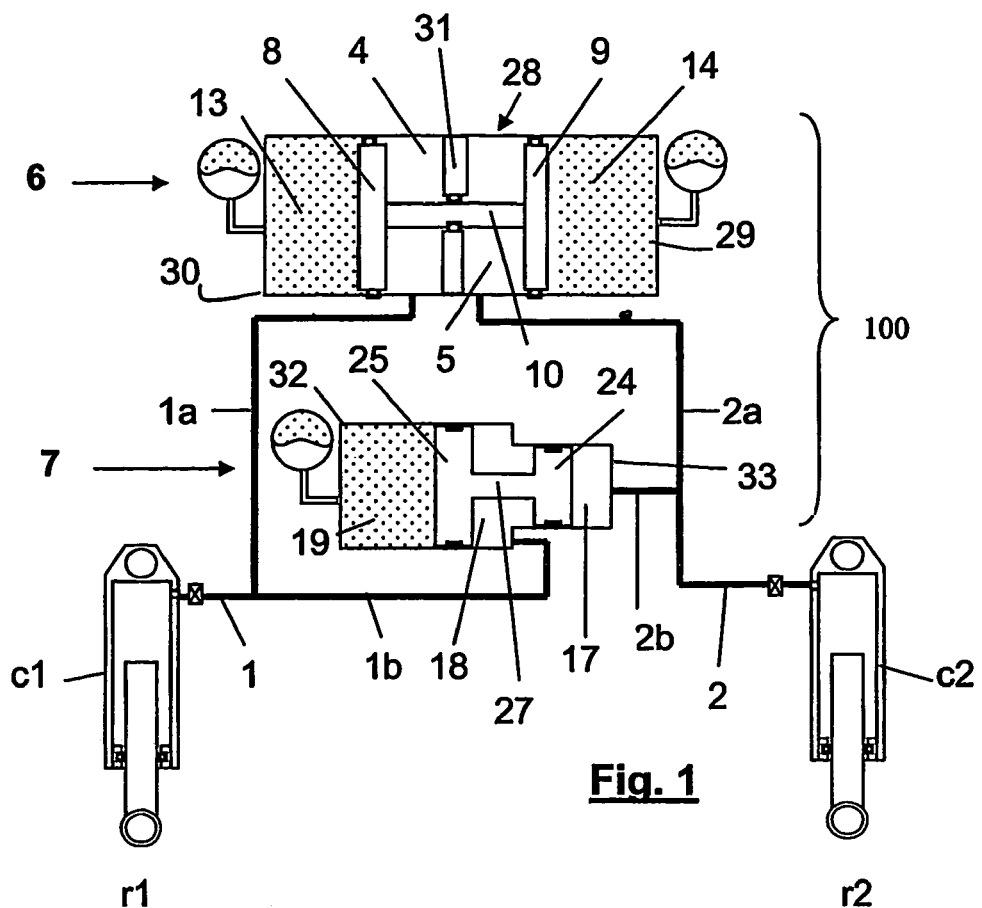
FIG. 1 is a diagrammatic representation of a complementary suspension device applied to a two-wheeled vehicle or to two of the wheels of a vehicle.

The diagram in FIG. 1 represents a first embodiment 100 of the central suspension device applicable to a two-wheeled vehicle or to two of the wheels of a vehicle.

Each of the wheels r1, r2 in FIG. 1 is connected to the vehicle body by a suspension system c1, c2, made up of a simple-effect hydraulic cylinder that transfers the vertical movement of the wheel to a hydraulic fluid, due to the fact that each hydraulic cylinder is provided with an upper cavity which undergoes variations in its volume proportional to the movement of a piston integral to the wheel axle, causing the displacement of the fluid stored in its interior.

The device which transforms the vertical movement of a wheel into a fluid displacement can be any other that is different from a simple hydraulic cylinder c1, c2, like those represented in FIG. 1, such as for example a bladder-type air suspension device, as long as the result is the same; that fluid displacement proportional to the vertical movement of the wheel takes place.

As can be observed, between the suspension systems c1 and c2 two distribution units, 6 and 7, are connected in parallel, so that the vehicle can be provided with a different performance in terms of the simultaneity or otherwise in the movements of the wheels r1 and r2 as regards the vehicle body.

Indeed, each suspension system c1, c2 is connected, through the joint conduits 1b and 2b to the distribution unit 7, made up of two co-axial cylinders 32, 33 of different diameter, connected to each other and closed at their ends, within which a double piston is arranged, made up of the pistons 24, 25, integral to a common rod 27, and situated respectively in the interior of the cylinders 32, 33, delimiting three chambers 17, 18 and 19 in the distribution unit 7.

The joint conduits 1b and 2b, which convey the displacement of fluid that comes from the suspension systems c1, c2 of the wheels r1 and r2, respectively, are connected to the chambers 17 and 18 of the distribution unit 7, whereas the end chamber 19 is connected to a pneumatic expansion cavity 50 which provides elasticity to the movement of the rod 27.

When a positive displacement of fluid occurs in both joint conduits 1b and 2b at the same time, through the effect of the pressure of the fluid washed over the pistons 24 and 25 a displacement of the rod 27 occurs, so that the volume of the outer chamber 19 will tend to reduce, compressing the elastic element 50, which in the embodiment in FIG. 1 is made up of a pneumatic expansion cavity, and cushioning the displacement of the rod 27 when the gas stored in its interior reaches high compression levels, responding to the thrust of the rod 27 and displacing it to its initial position.

It is important to note that the function exercised by the pneumatic expansion cavity can be performed in other ways, so that it may be any other elastic means which exercises the same function, such as a helicoidal spring or a elastomer block connected to the rod of the distribution unit, as well as a gas or other type of compressible fluid stored in the expansion chamber 19.

At the same time each hydraulic cylinder c1, c2 is also connected, through the joint conduits 1a and 2a to distribution unit 6 made up of a hydraulic cylinder 28 which has two outer walls 29 and 30 and is divided by a third fixed central wall 31 which determines two compartments, the distribution unit 7 being provided with a rod 10, moveable axially in the interior of the cylinder 28, fitted with two pistons 8, 9 situated respectively in one of the compartments and delimiting two chambers in each one. The resulting chambers are the chambers 13, 4, 5 and 14.

The joint conduits 1a and 2a are connected, respectively, to the chambers 4 and 5 of the distribution unit 6, whereas the elastic means 50 act on the outermost chambers 13 and 14, also made up of pneumatic expansion cavities 50, just as on the previously described chamber 19.

When a positive displacement of fluid occurs in both joint conduits 1a and 2a at the same time, the rod 10 of the distribution unit 6 will remain motionless when the pressures exerted on the pistons 8 and 9 of the chambers 4 and 5 are compensated, so that it will be the distribution unit 7 that has the job of regulating and cushioning a positive displacement of both wheels at the same time.

On the other hand, in the opposite case, when the wheels move in reverse direction, the distribution unit 7 will remain rigid and it will be the elastic elements 50, in the form of gas stored in the expansion chambers 13 or 14 of the distribution unit 6 or in the form of pneumatic expansion cavities, which will determine the amount and the cushioning of the movement of the wheels r1 and r2.

The distribution unit 6 allows, in addition, the substitution of the hydro-pneumatic cavities arranged in the individual suspension systems which tend to be used in the known suspension devices, wherein said pneumatic cavities are usually connected hydraulically to the devices that transform the vertical movement of the wheels into fluid displacement, in this case c1 and c2, and which are usually the cause of many breakdowns due to wear and tear or splitting of the membrane stored in its interior.

The central suspension device 100 in the figure makes it possible therefore to regulate in a different way the cushioning or the elasticity of movements of the wheels r1 and r2 according to whether the latter move at the same time or not, since if they tend to move in the same direction a first distribution unit 7 is activated whose response depends on the elastic elements 50 of the distribution unit 7, and if the wheels r1 and r2 tend to move in the opposite direction, a second distribution unit 6 acts, whose elastic or cushioning properties may differ from the first unit as the corresponding elastic element 50 is of different properties. In this way, one can choose to give priority to the joint movement of one pair of wheels or to the different movement of the same pair of wheels.

The cushioning modules 40, 41 act independently on each of the hydro-pneumatic suspension systems of the wheels r1 and r2, in such a way that the increase of the fluid pressure transferred to the complementary suspension device is proportional to the movement speed of each one of the wheels.

The cushioning modules 42 and 43 condition the simultaneous movements and in the same direction of the two wheels r1 and r2 associated to the second distribution unit 7, so the fluid pressure variation is proportional to the average displacement speed of the wheels r1 and r2, whereas the cushioning modules 44 and 45 condition the simultaneous movement but in the opposite direction of the two wheels r1 and r2, therefore the fluid pressure variation is proportional to the difference between the displacement speeds of said wheels.

Even though these modules are optional, when the device comprises the modules 40 and 41 the expansion chambers 13, 14 and 19 can store a gaseous or viscous state fluid or a mixture of both. When using a non-compressible fluid, such as a liquid, a hydro-pneumatic sphere can be used connected by placing a cushioning module between the sphere and the respective chamber. In such a case, the cushioning module associated with the cavities 19 (in the second distribution unit 7) and 13 and 14 (in the first distribution unit 6) are superfluous with the modules 41 and 43.

If there are suitable means for inserting or extracting the fluid of the chamber 19, it is possible to vary the vehicle height although if the fluid stored in the chamber is a gas, not only will the vehicle height be regulated but also the elastic performance of the distribution unit, i.e. the elastic response to the simultaneous movement and in the same direction as the wheels r1 and r2 of the vehicle.

In the same way, it is possible to arrange the same means for extracting or inserting fluid in the chambers 13 and 14 in so far as, if the amount of fluid inserted or extracted is the same in both chambers the vehicle's dipping will not vary whereas if the amount of fluid extracted or inserted into the chambers is not the same, the vehicle's dipping will be modified.

Figure 2:
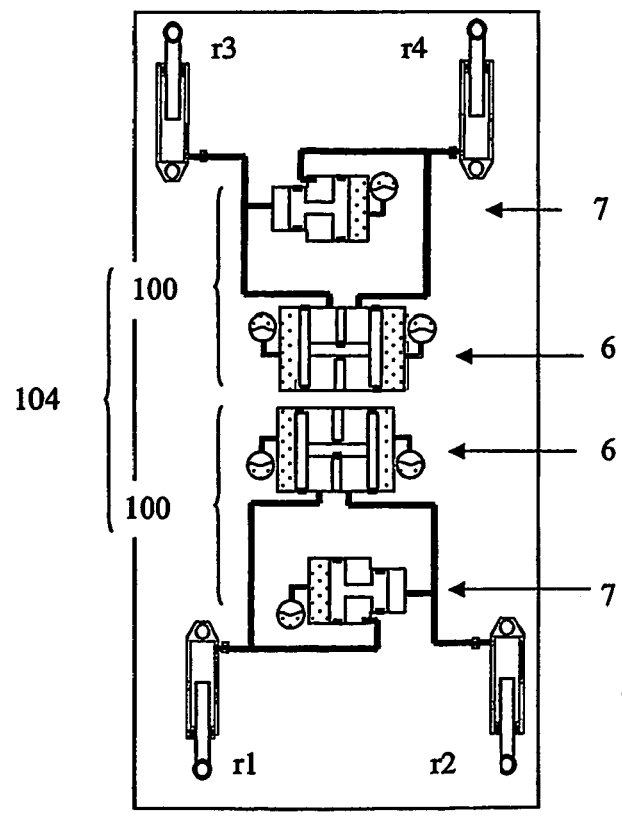
FIG. 2, is a diagrammatic representation of a four-wheeled vehicle provided with two complementary suspension devices similar to that in FIG. 1.

In the case of a four-wheeled vehicle, the device 100 described in FIG. 1 can be applied between any pair of wheels of the vehicle whether they be the two front wheels or the two rear wheels, as shown in FIG. 2, or between the wheels of the same side of the vehicle.

In the case in FIG. 2, the central suspension devices 100, like those described in FIG. 1, transversally connect the vehicle wheels, so it is possible to intervene in the movement of the vehicle's bodywork, favouring or otherwise, the pitching movements as opposed to the rocking ones or those of crossed axles.

The arrangement of the resulting complementary suspension devices 104 in FIG. 2 can be completed by adding a third joint conduit in each of the suspension systems c1, c2 of the wheels r1, r2 of the vehicle, by connecting each suspension system with its diagonal opposite through disclosed load distribution systems.

Figure 3:
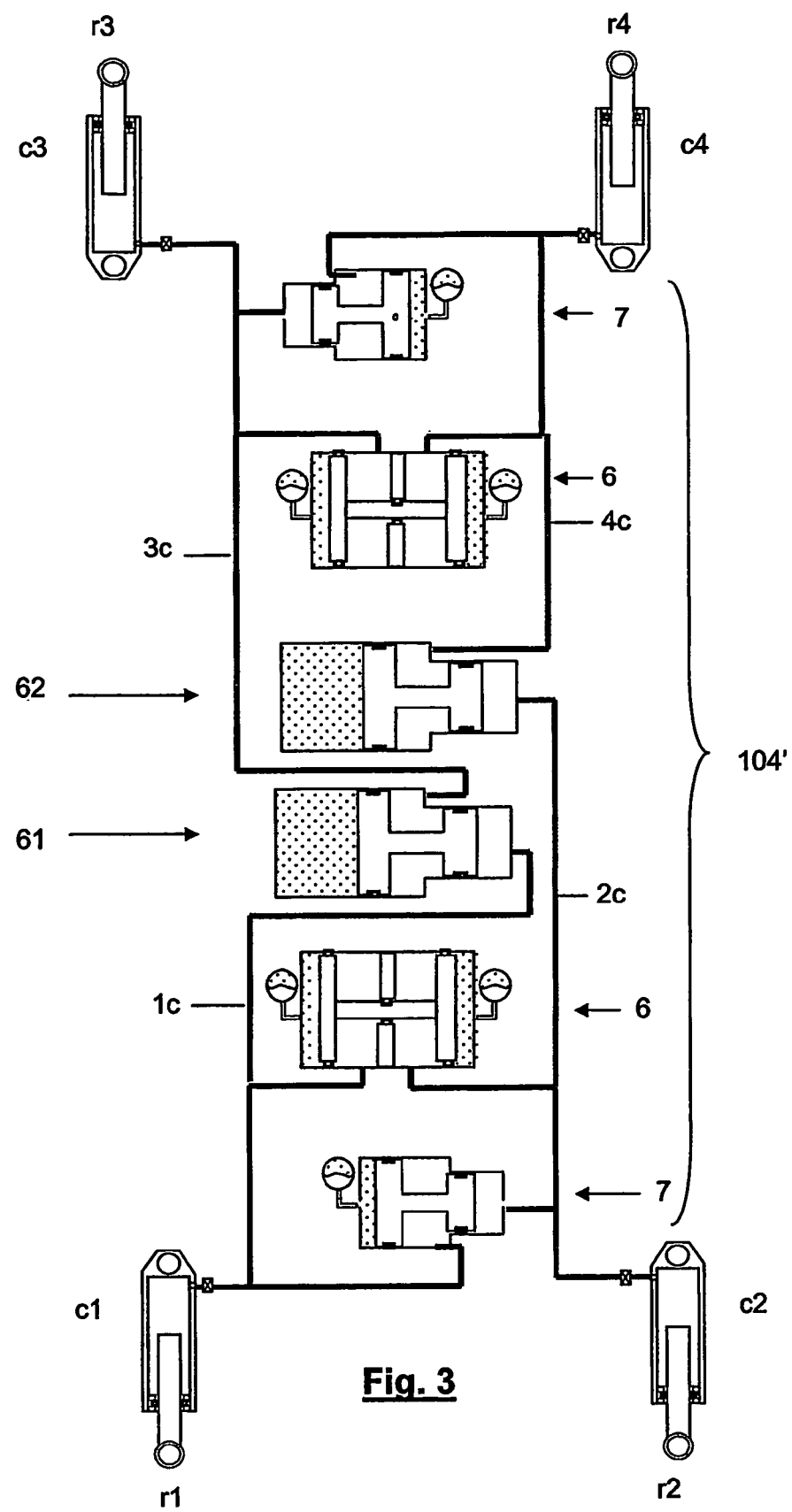
FIG. 3, is a diagrammatic representation of a four-wheeled vehicle provided with two complementary suspension devices similar to that in FIG. 1 and with connection of the diagonally opposing wheels by two double pistons.
Figure 4:
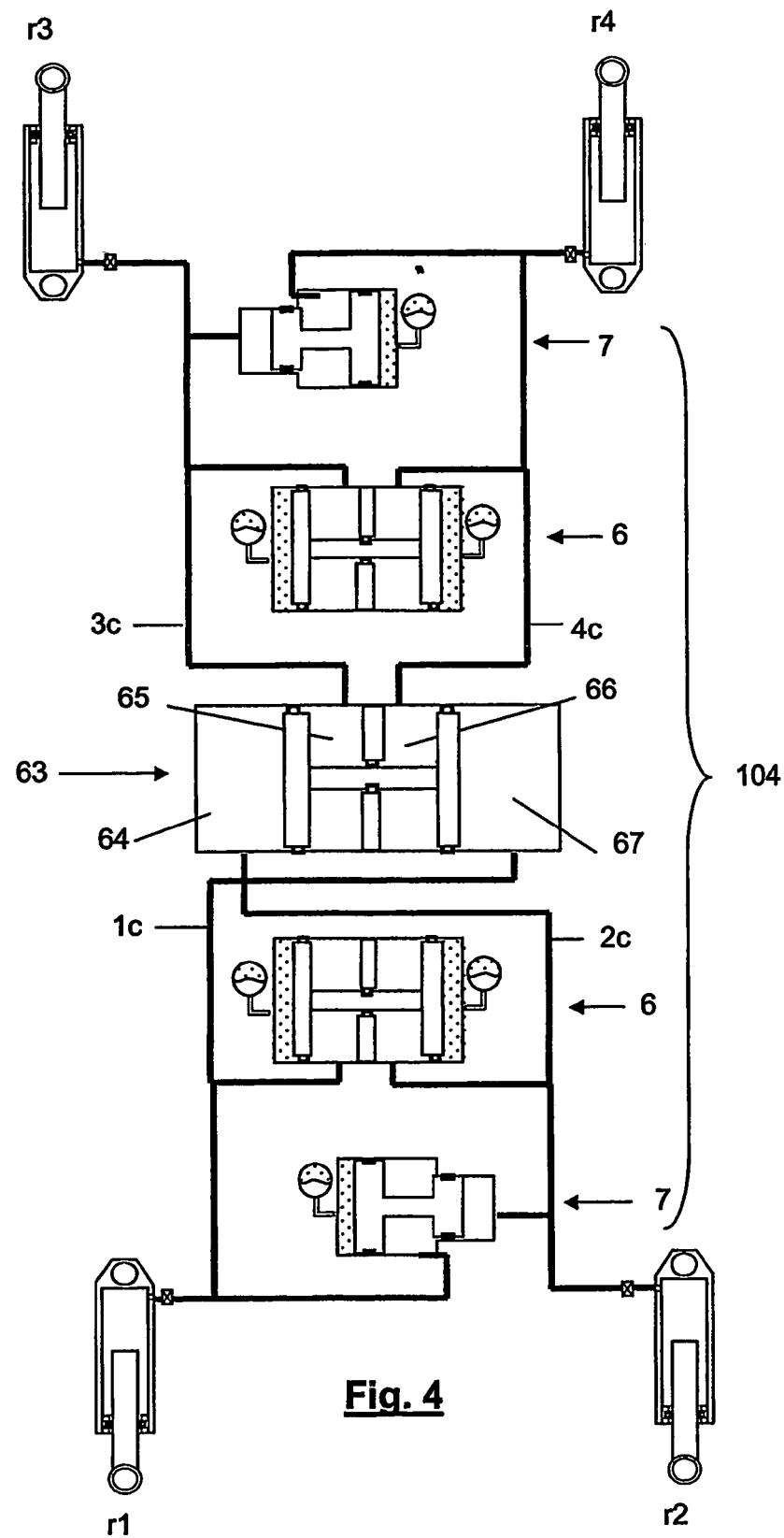
FIG. 4, is a diagrammatic representation of a four-wheeled vehicle provided with two complementary suspension devices similar to that in FIG. 1 and with connection of the diagonally opposing wheels by a double rod piston.

FIGS. 3 and 4 are an example of among all the possible combinations of the connections that offer an enhanced overall performance of the vehicle adding to the system the possibility of regulating the elasticity and cushioning of the diagonally opposing wheels.

In FIG. 3, the arrangement of the complementary suspension devices 104 is complemented by two double piston devices 61 and 62, such as those which make up distribution unit 7 in FIG. 1, connected diagonally to the suspension systems of each wheel through the joint conduits 1c, 4c and 2c and 3c respectively, which connect to the intermediate cavities of smaller diameter of the double piston devices 61 and 62. The cavities of the end with a greater diameter are also directly connected to each other in the case of FIG. 3 although they could be by means of a valve that can be opened or closed at will for isostatic proportionality to the system.

On the other hand, in FIG. 4, the connection is made through a double rod piston 63 and four chambers 64, 65, 66 and 67, like the one which comprises the distribution unit 6 of the device in FIG. 1.

The joint conduits 1c and 2c of the rear wheels are connected to the outermost chambers 64 and 67 whereas the joint conduits 3c and 4c of the front wheels are connected to the interior chambers 65, 66.

According to this configuration, the double rod piston 63 will have a rigid performance to the movement of the crossed axles, which is the same as a positive displacement and, at the same time, in diagonally opposing wheels, as, in the situation in which a positive fluid displacement in the branches 1c and 4c which come from diagonally opposing wheels tends to occur, for example, an equivalent pressure will be exerted on both sides of a same piston, compensating both forces and with the piston rod 63 remaining motionless. In the same way, it would occur with a dipping movement of the vehicle as the fluid pressures that circulate around the branches 1c and 2c would also be compensated in the double rod piston 63 and the elasticity and cushioning of the dipping movement would depend on the distribution unit 7.

Figure 5:
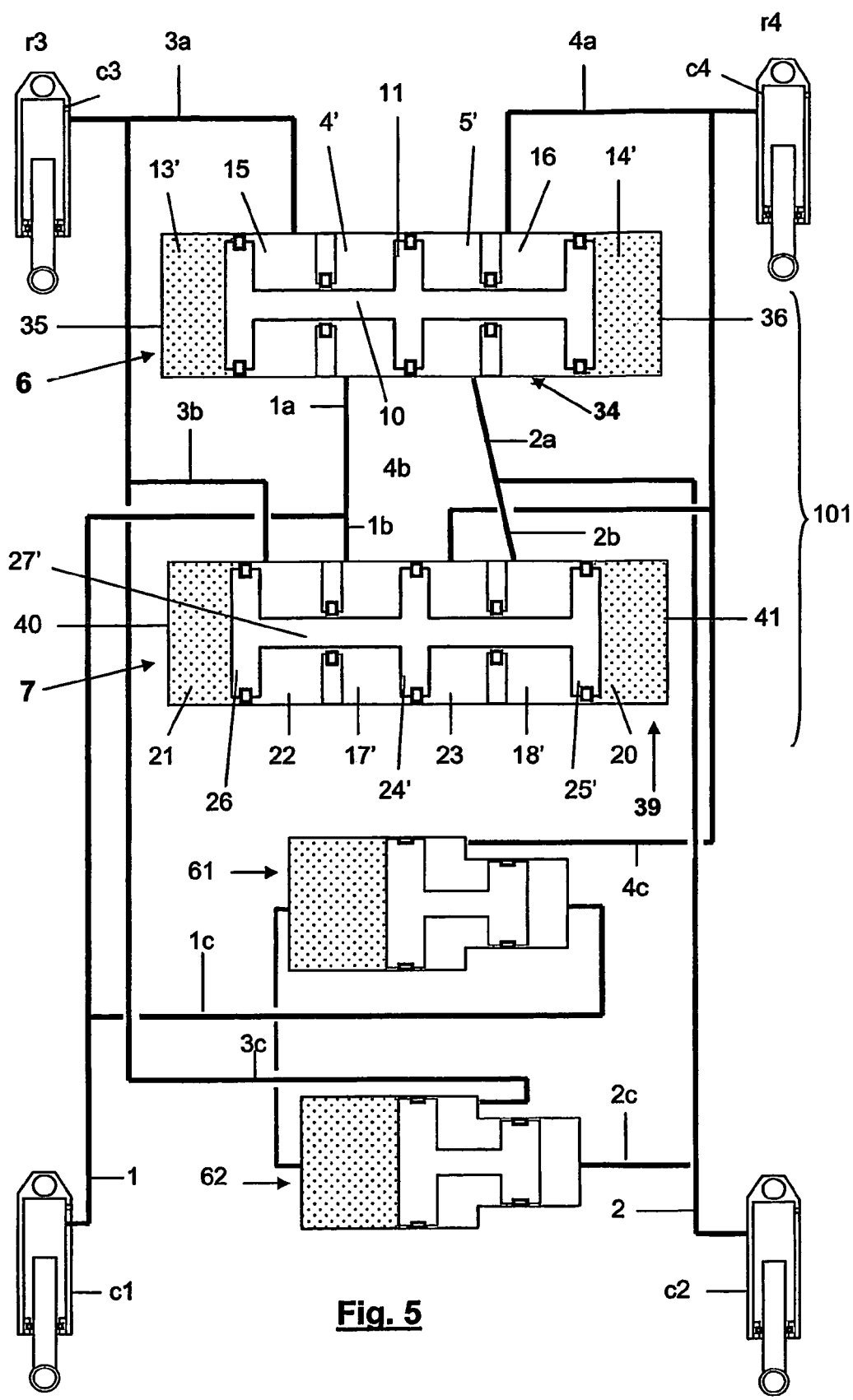
FIG. 5, is a diagrammatic representation of a second embodiment of the complementary suspension device applied to a four-wheeled vehicle.

FIG. 5 represents a second embodiment 101 of the complementary suspension device object of the invention applied to a four-wheeled vehicle.

The double piston devices 61 and 62 are the same as those in FIG. 3, which connects the diagonally opposed vehicle wheels through the joint conduits 1c, 2, 3c and 4c.

Just as in the previous Figs., each of the wheels r1, r2, r3 and r4 is connected to the vehicle body by means of a simple-effect hydraulic cylinder c1, c2, c3 and c4 respectively, which transfers the vertical movement of the wheel to a hydraulic fluid which is displaced through the interior of the conduits 1, 2, 3 and 4 also respectively, and just as in the prior embodiment, two distribution units, 6 and 7 are connected in parallel between the suspension systems of one pair of wheels.

In this embodiment, however, and unlike FIGS. 2, 3 and 4, instead of having two distribution units 6 and two distribution units 7 in the vehicle, one for each pair of wheels, the distribution units 6 and 7 have a greater number of chambers and pistons so that the four wheels (and not just two) may be connected to each distribution unit, so that the latter are shared.

Just as in FIG. 2, the distribution unit 6 will perform rigidly as regards the combined movement of the two front wheels r3 and r4 and the two rear wheels r1 and r2. Nevertheless, in this embodiment, it will also perform rigidly as regards the combined movement of the vehicle wheels of a same side r1 and r3 or r2 and r4.

The distribution unit 7, as in FIG. 2, will be the distribution unit with the task of absorbing and guaranteeing the elasticity of the combined movements of the vehicle front and back wheels.

For such purpose, the distribution unit 6 in FIG. 5 is made up of a hydraulic cylinder 34 that has two outer walls 35 and 36 and two inner fixed walls 37 and 38 which determine three compartments. The rod 10' displaces axially in the interior of the cylinder 34 and is fitted with three pistons 10, 11 and 12, each one situated respectively in one of the compartments, delimiting two chambers in each of them. Of the resulting chambers 13', 15, 4', 5', 16 and 14', the outermost ones 13' and 14' are full of pressurised gas or hydraulic fluid which will provide the elastic component solution to the rod 10' displacement, whereas the four interior chambers 15, 4', 5' and 16 are connected respectively to the joint conduits 3a, 1a, 2a and 4a with the suspension systems c3, c1, c2 and c4 of the wheels r3, r1, r2 and r4, so that, when a positive variation of equivalent pressure occurs in and both joint conduits at the same time originating in the suspension systems of two matching wheels, 1a and 2a or 3a and 4a, the rod 10' remains motionless as the pressures exerted on the pistons 11 or 10, 12 of the two chambers 4', 5' or 15, 16 to which the joint conduits 1a and 2a or 3a and 4a are connected are compensated, the distribution unit 7 performing rigidly to the combined flow (corresponding to the vehicle dipping movements) and elastically when the positive variation pressure comes from the first branches of non-matching wheels (which correspond to crossed axle movements).

The distribution unit 7 in FIG. 5 is made up of a hydraulic cylinder 39 that has two outer walls 40, 41 and two central inner walls 42, 43 which determine three compartments, a rod 27' being arranged and axially moveable in the interior of the cylinder 39 and fitted with three pistons 26, 24', 25' situated respectively in one of the compartments, delimiting two chambers in each of them. Of the resulting chambers 21, 22, 17', 23, 18', 20, the outermost ones 21 and 20 are full of pressurised gas or hydraulic fluid which will provide the elastic component solution to the rod 27' displacement, whereas the four interior chambers 22, 17', 23 and 18' are connected, respectively, to the joint conduits 3b, 1b, 4b and 2b with the suspension systems c3, c1, c4 and c2 of the matching wheels r1, r2, and r3, r4, so that, when a positive variation of pressure occurs in the joint conduits with the suspension systems of two non-matching wheels, the rod 27' remains motionless as the pressures exerted on the pistons 26 and 24', 24' and 25', 26 and 25' or 24' of the chambers 22 and 17', 23 and 18', 22 and 18' or 17' and 23 are compensated, the distribution unit 7 performing rigidly to said combined flow (corresponding to the vehicle rocking or crossed axle movements) and elastically when the positive variation pressure comes from two of the second branches of matching wheels 1b and 2b or 3b and 4b.

The connection of the two hydraulic cylinders 28, which make up the two distribution units 6 in FIG. 2, in a single hydraulic cylinder 34 (FIG. 5) and the connection of the two double hydraulic cylinders 32, 33, which make up the two distribution units 7 in FIG. 2, in a single hydraulic cylinder 39 (FIG. 5) does not have to be made at the same time, therefore a single hydraulic cylinder 39 may exist and two hydraulic cylinders 28, there being one distribution unit 7 and two distribution units 6, and the other way round, a single hydraulic cylinder 34 and two double cylinders 32, 33, there being a single distribution unit 6 and two distribution units 7.

Just as occurred with the embodiments represented in FIG. 3, the complementary suspension device in FIG. 5 is complemented by two double piston devices 61 and 62, such as those that make up the distribution unit 7 in FIG. 1, connected diagonally to the suspension systems of each wheel through the joint conduits 1c, 4c and 2c and 3c, respectively, which connect to the intermediate cavities and of less diameter than the double piston devices 61 and 62. The cavities from the end with a greater diameter are also connected to each other directly although they could be through a valve that can be opened and closed at will for isostatic proportionality to the system.

Naturally, this connection between the suspension systems of diagonally opposite wheels, could be made through a double rod piston 63 and four chambers 64, 65, 66 and 67 as in the one which makes up the distribution unit 6 of the device in FIG. 1, analogously to the embodiment in FIG. 4.

Figure 6:
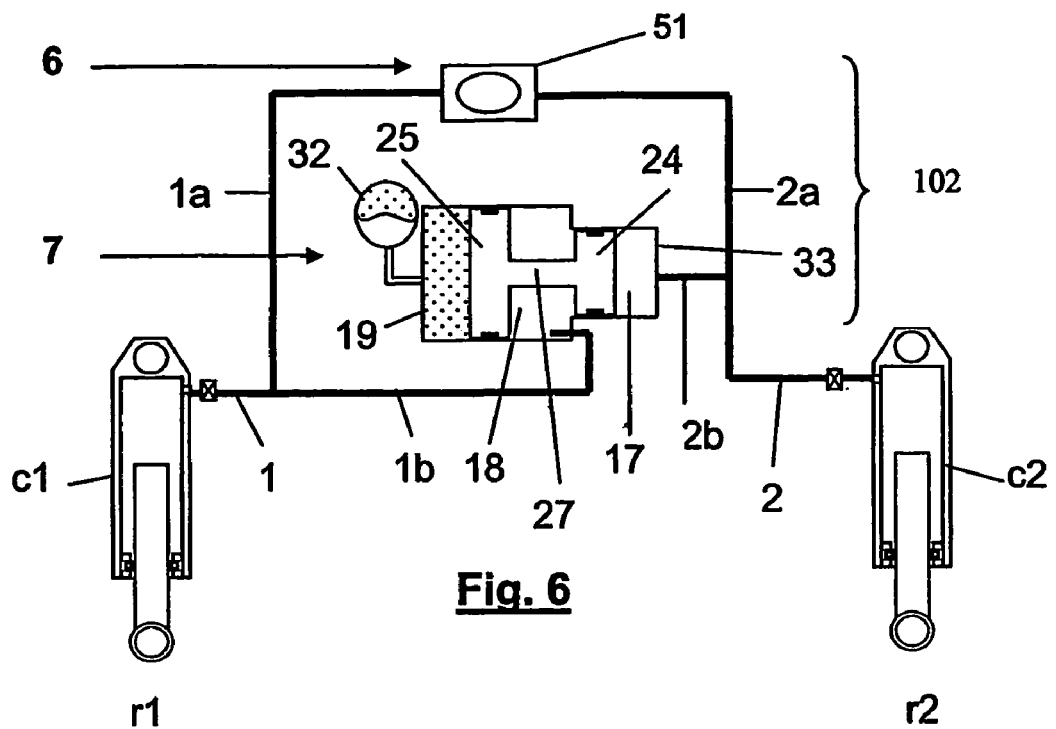
FIG. 6, is a diagrammatic representation of a third embodiment of a complementary suspension device applied to a two-wheeled vehicle or to two wheels of a vehicle.

FIG. 6 shows a third embodiment 102 of the complementary suspension device, wherein the distribution unit 6 is made up of a restrictor valve 51, connected between the suspension systems c1 and c2 of the wheels r1 and r2 of a vehicle, and in parallel to the distribution unit 7, identical to that represented in FIG. 1.

This embodiment, unlike that represented in FIG. 1, does not limit the amount of fluid displaced by the suspension system from one of the wheels when the latter displaces in the opposite direction to the opposite wheel, as the distribution unit 6 is not provided with a rod whose stroke is limited by the hydraulic cylinder wall housing it therein.

The cushioning of the wheel's movement is achieved with the restriction of the flow of the displaced fluid originating in the corresponding suspension system, in the restrictor valve 51, which acts in the same way regardless of the direction of the flow of the fluid through it.

With regard to the combined movement of the wheels r1 and r2 of the vehicle, this will be cushioned and regulated by the distribution unit 7 as used to occur in the prior embodiments.

Figure 7:
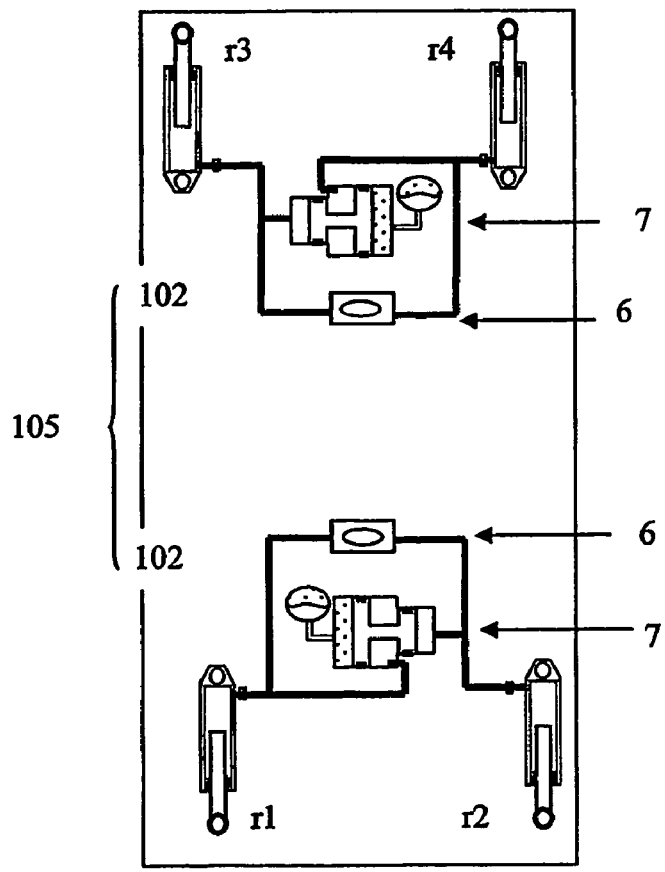
FIG. 7, is a diagrammatic representation of a four-wheeled vehicle provided with two complementary suspension devices similar to that in FIG. 7.

Naturally, this device may complement the suspension systems of a four-wheeled vehicle in the same way as prior embodiments. To take a case in point, the two distribution units 6 and 7 of the device 102 in FIG. 6, can connect in parallel between the front wheels r3 and r4 of a vehicle at the same time as an analogous device, with their corresponding distribution units 6 and 7, it connects in parallel between the rear wheels r1 and r2 of the vehicle. Such arrangement is the one shown in FIG. 7.

It should be said that the connection in parallel of both distribution units 6 and 7 can also be made between wheels on one side of the vehicle, whatever the embodiment of the complementary suspension device, so that the suspension systems between which said distribution units 6 and 7 are connected, correspond to those of the wheels r1, r3 and r2 r4 respectively.

Figure 8:
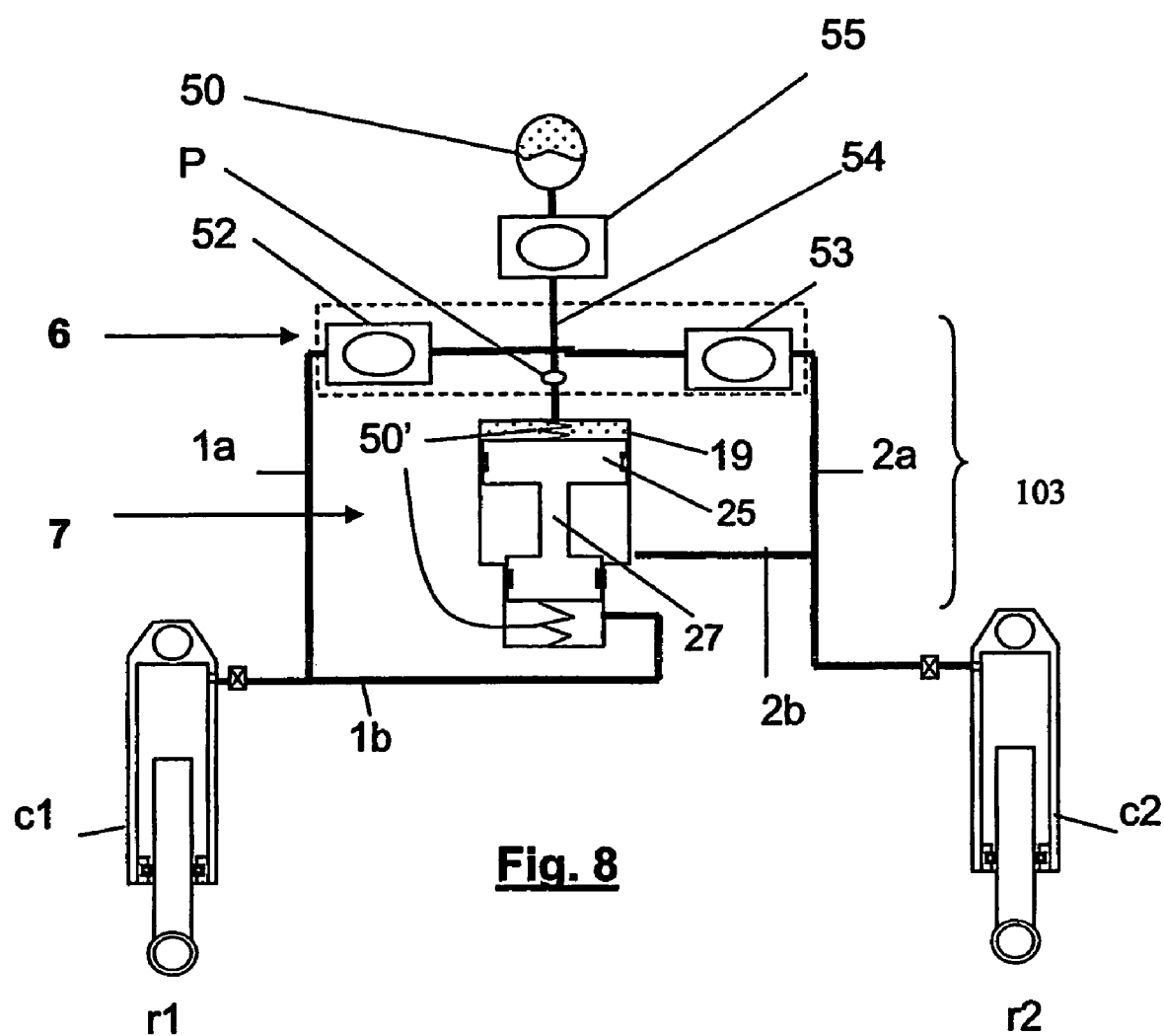
FIG. 8, is a diagrammatic representation of a fourth embodiment of a complementary suspension device applied to a two-wheeled vehicle or to two wheels of a vehicle.

FIG. 8, shows a fourth embodiment 103 of the complementary suspension device object of the invention, wherein the distribution unit 6 comprises two restrictor valves 52 and 53 connected in series, the joint conduits of the valves 52 and 53 being in contact with the distribution unit 7, with the joint conduit 54 of the larger chamber 19 to be precise, of the aforementioned distribution unit 7, with the elastic element 50, in this case made up of a pneumatic cavity or hydrosphere.

The distribution unit 7 of the embodiment 103 is analogous to the distribution unit 7 of the embodiment 100 in FIG. 1, made up of two co-axial cylinders of different diameter, connected to one other and closed at their ends, within which a double piston integral to a common rod is arranged. Nevertheless, in this case, the distribution unit is provided with elastic support means 50', which complement the performance of the elastic element 50 represented in the form of a pneumatic cavity, or hydrosphere, provided with a restrictor valve.

In the event of the vehicle wheels r1 and r2 moving in unison, in the same direction, the fluid displaced in the two suspension systems c1 and c2 will tend to travel along the path of least resistance, which is the one that leads to the distribution unit 7, wherein the volume of the chambers 17 and 18 will increase in order to house the displaced fluid, at the same time displacing the rod 27, not without a certain degree of resistance due to the effect the elastic means 50' and the elastic element 50 exert over it, a hydrosphere here, so that the sudden movement of the wheels r1 and r2 will be cushioned.

In borderline cases, the pressure on the joint conduits 1a and 2a of the suspension systems c1 and c2 with the distribution unit 6, may be such that the two valves 52 and 53 let the fluid flow through it and towards the pneumatic cavity or hydrosphere. In this case, the fact that the distribution unit 6 allows the inflow of fluid through the two joint conduits with the two suspension systems may even prove beneficial for the protection of the system, since it would avoid the piston with the greater diameter 25 reaching the end of its stroke brusquely, bumping into the larger chamber wall 19 of the distribution unit 7 and even damaging it, or causing unwanted wear and tear over time, both of the piston and the aforementioned wall.

Figure 9:
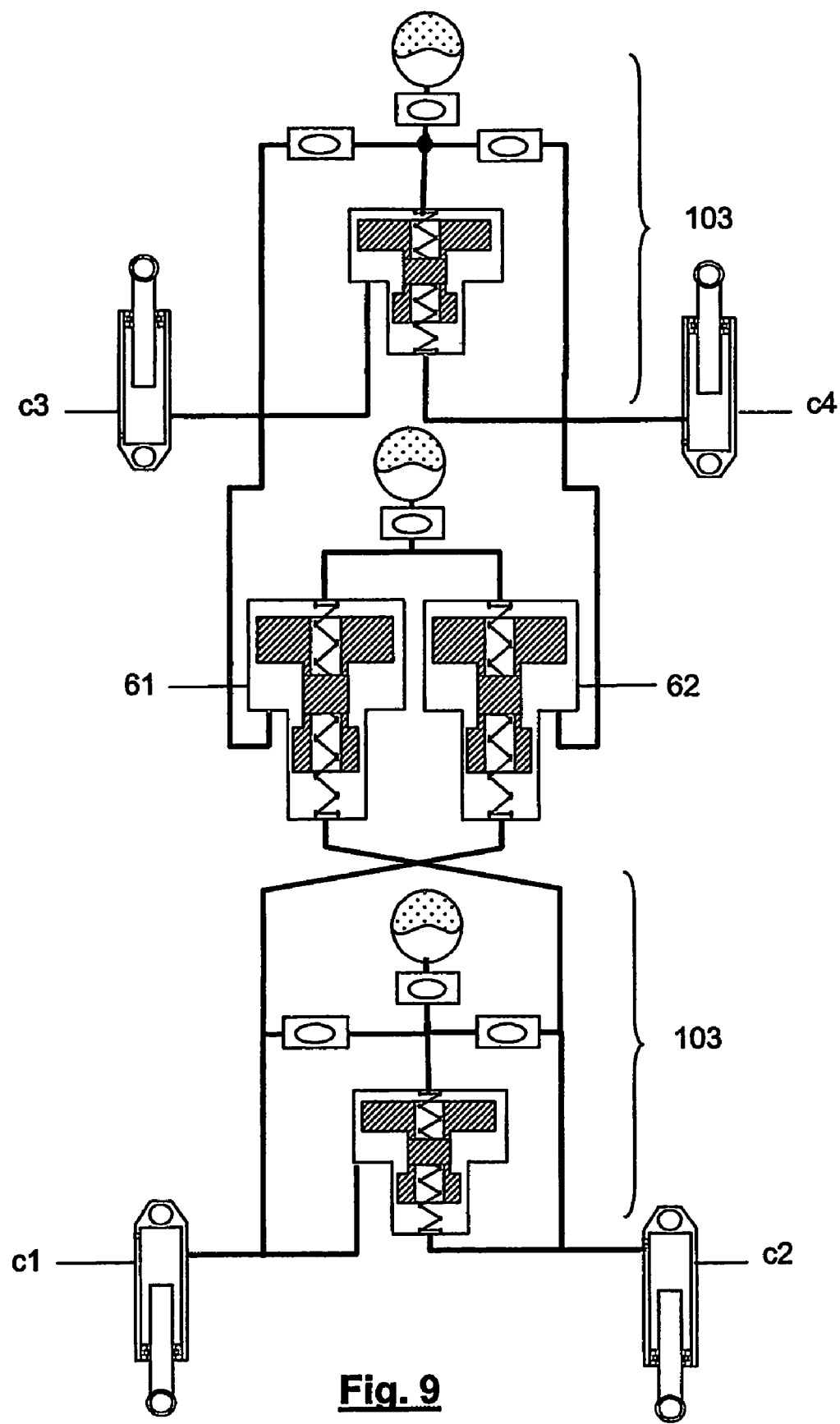
FIG. 9, is a diagrammatic representation of a four-wheeled vehicle provided with two complementary suspension devices similar to that in FIG. 8 and with connection of the diagonally opposing wheels by two double pistons.
Figure 10:
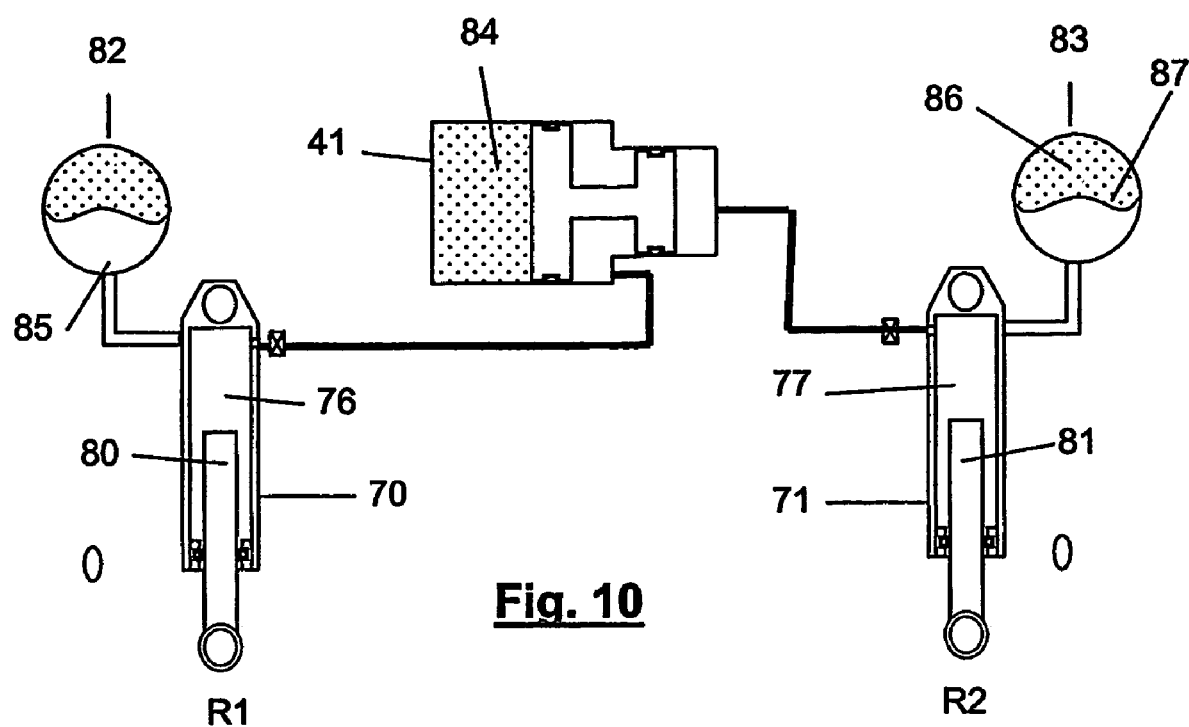
FIG. 10, is a diagrammatic representation of a known complementary suspension device.

As in the prior embodiments, there exists the possibility of applying the embodiment 103 of the complementary suspension device to a four-wheeled vehicle, either interconnecting two independent embodiments, as in FIG. 8, between the front wheels and the back wheels of the vehicle, respectively, or between the matching wheels of the same side of the vehicle, or by including in the device the possibility of regulating the elasticity and cushioning of the diagonally opposed wheels, complementing it, for example, with two double piston devices 61 and 62, such as the ones which make up the distribution unit 7 in FIG. 1, as shown in FIG. 9.

Figure 11:
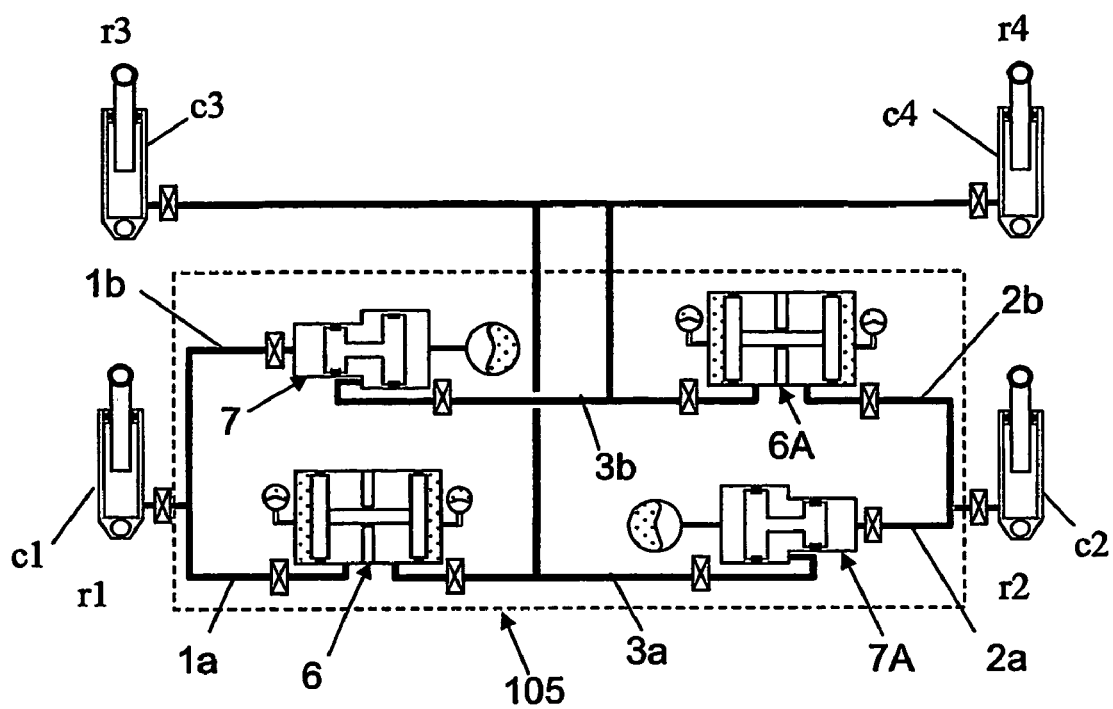
FIGS. 11 thru 13, are diagrammatic representations equivalent to a fifth embodiment of a complementary suspension device applied to a four-wheeled vehicle
Figure 12:
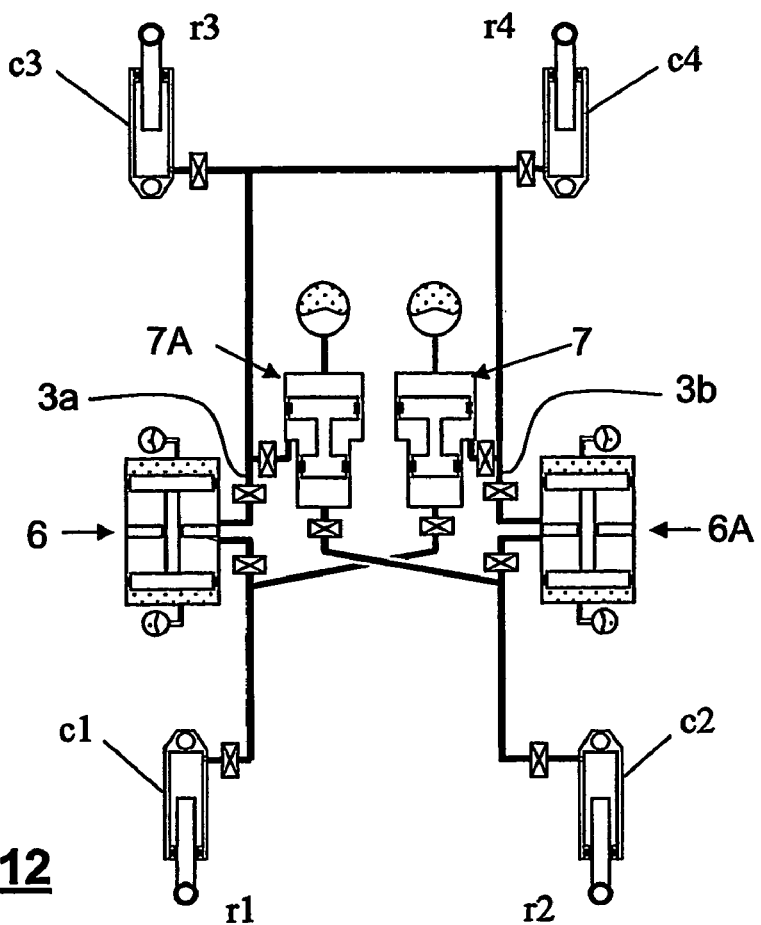

In the equivalent embodiment in FIGS. 11 and 12, the complementary suspension device 105 is connected between the hydro-pneumatic suspension systems c1 and c2 of the pair of wheels r1 and r2, respectively, of a four-wheeled vehicle.

In this system, both the first distribution unit 6 and the second distribution unit 7, are hydraulically connected in series with respective distribution units 6A and 7A, the distribution unit 7A being connected in series with the first distribution unit 6 analogous to the second distribution unit 7, and the distribution unit 6A connected in series to the second distribution unit 7 analogous to the first distribution unit 6. Thus, each of the two connection branches with the wheels r1 and r2 comprise two distribution units, each of which has a different performance with regard to the possibility of storing fluid, or of decanting it. A complementary suspension system which comprises the complementary device 105 in FIG. 11 or 12, connected hydraulically between the two rear wheels of a four-wheeled vehicle, and in which the hydraulic suspension systems c3 and c4 of the front wheels r3 and r4 are connected hydraulically to each other and with the joint conduits 3a and 3b of the two distribution units connected in series, respectively, succeeds in the suspension systems c3 and c4 of the vehicle not offering any resistance to the rocking, and that the latter is controlled by the complementary suspension device 105 connected between the hydraulic suspension systems c1 and c2 of the rear wheels r1 and r2 respectively. With this, an enhanced vehicle weight distribution is achieved at the expense of an asymmetric anti-rocking effect between the front wheels r3 and r4 and the rear ones r1 and r2. Such an effect would be preferable in those vehicles with only a two-wheel drive, said wheels being hydraulically connected to one another, increasing the traction capacity thereof. In the example in FIGS. 11 and 12, said driving wheels, are the front wheels r3 and r4.

Figure 13:
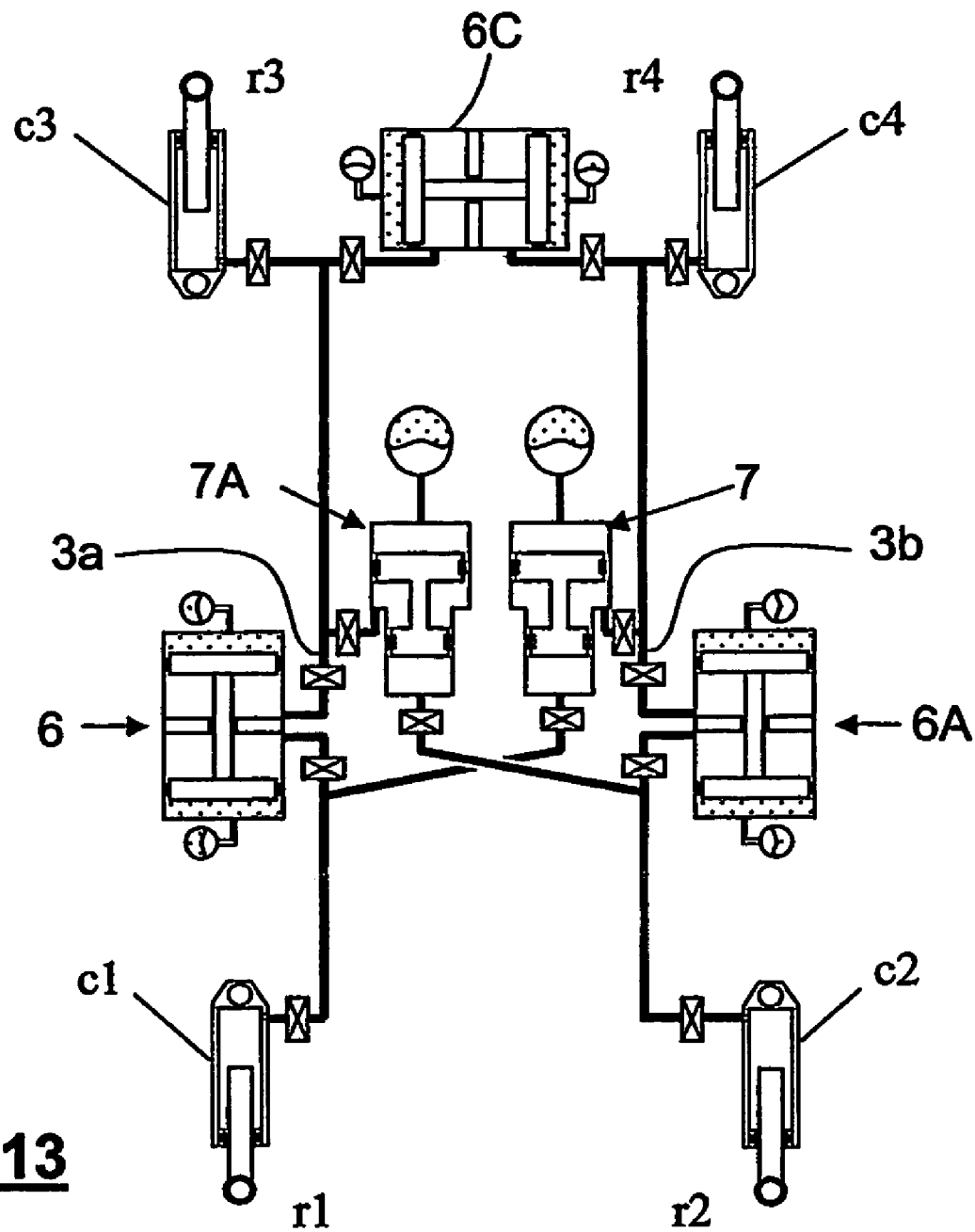

In order to partly solve the asymmetry caused by the connection between the transversally opposed wheels r3 and r4, the complementary suspension system in FIG. 13 also comprises a distribution unit 6C, analogous to the first distribution unit 6 of the complementary suspension device 105, connected between the hydro-pneumatic suspension systems c3 and c4 of the front wheels r3 and r3. Thus, the movement of fluid between said wheels r3 and r4 is restricted by the distribution unit 6C, increasing the resistance to the rocking and decreasing the asymmetry of the resistance to the rocking between the front wheels and the rear wheels of the vehicle.

Controlling this asymmetry becomes fundamental for defining the dynamic characteristics of a vehicle such as the characteristic under-sway or over-sway thereof as a greater resistance to the rocking in one axle causes increased roll in the tires when the vehicle is cornering.

Naturally, the distribution unit 6C could be arranged between the two rear wheels r1 and r2 of the vehicle with the same aim of eliminating the asymmetry as far as the rocking response is concerned, or it could have two units 6C, a first unit 6C being arranged between the two front wheels r3 and r4 and a second distribution unit 6C between the two rear wheels r1 and r2.

In the same way, the inventor envisages either one distribution unit analogous to the second distribution unit 7 between the pairs of front wheels (r1, r2) and/or rear (r3, r4) or a complementary suspension device 100 according to FIG. 1.

It should be noted that the complementary suspension device object of the invention can also be applied to a vehicle with an odd number of wheels, such as for example a three-wheeled vehicle. In this case, the arrangement of the device may vary according to the needs or response one wishes to give the vehicle. One of the possible solutions consists of connecting the two distribution units 6 and 7 in parallel between the suspension system of the single front wheel, and a single joint conduit that comes from the suspension systems of the two rear wheels.

The invention claimed is:

1. A complementary suspension device, applicable between at least a first hydro-pneumatic suspension system of a first wheel and a second hydro-pneumatic suspension system of a second wheel, wherein the first hydro-pneumatic suspension system and the second hydro-pneumatic suspension system transfer forces originating in said first wheel and said second wheel, respectively, to the complementary suspension device by displacement of fluids of said first and second hydro-pneumatic suspension systems through joint conduits, the complementary suspension device comprising:
   a first fluid distribution unit; and
   a second fluid distribution unit;
   wherein the first fluid distribution unit and the second fluid distribution unit are configured to be connected in parallel between the first hydro-pneumatic suspension system and the second hydro-pneumatic suspension system;
   wherein the first fluid distribution unit is configured to allow intake of fluid from one of the first hydro-pneumatic suspension system and the second hydro-pneumatic suspension system and, at the same time, allow fluid to exit to the other one of the first hydro-pneumatic suspension system and the second hydro-pneumatic suspension system;
   wherein the second fluid distribution unit only allows intake of fluid from both of the first hydro-pneumatic suspension system and the second hydro-pneumatic suspension system at the same time;
   wherein the complementary suspension device further comprises;
   a third fluid distribution unit analogous to the first fluid distribution unit; and
   a fourth fluid distribution unit analogous to the second fluid distribution unit;
   wherein one of the third fluid distribution unit and the fourth fluid distribution unit is connected in series to the first fluid distribution unit, and the other one of the third fluid distribution unit and the fourth fluid distribution unit is connected in series to the second fluid distribution unit.

2. The complementary suspension system according to claim 1, wherein the third distribution unit comprises the same number of pistons and chambers as the first fluid distribution unit; and
   wherein the fourth fluid distribution unit comprises the same number of pistons and chambers as the second fluid distribution unit.

3. The complementary suspension system according to claim 1, wherein:
   the one of the third fluid distribution unit and the fourth fluid distribution unit that is connected in series to the first fluid distribution unit is connected in series to the first fluid distribution unit between the first hydro-pneumatic suspension system and the second hydro-pneumatic suspension system.

4. The complementary suspension system according to claim 1, wherein:
   the other one of the third fluid distribution unit and the fourth fluid distribution unit that is connected in series to the second fluid distribution unit is connected to the second fluid distribution unit between the first hydro-pneumatic suspension system and the second hydro-pneumatic suspension system.

5. The complementary suspension device according to claim 1, wherein the second fluid distribution unit comprises:
   at least three chambers; and
   at least one piston;
   wherein each of the at least three chambers of said second fluid distribution unit are separate, without direct communication of fluid between the at least three chambers and wherein each of the at least three chambers has a variable volume proportional to a stroke of the at least one piston;
   wherein each of the at least one piston is integrally attached to a connecting rod, such that each of the at least one piston displaces simultaneously, so that when a positive pressure variation occurs at the same time in the first hydro-pneumatic suspension system and the second hydro-pneumatic suspension system, the positive pressure variation causes an increase in a volume of a first one of the at least three chambers and a second one of the at least three chambers;
   wherein the second fluid distribution unit behaves elastically when there is a combined fluid flow from the first hydro-pneumatic suspension system and the second hydro-pneumatic suspension system due to a force exerted by elastic means on the at least one piston; and
   wherein the at least one piston remains motionless in response to an opposing fluid flow from the first hydro-pneumatic suspension system and the second hydro-pneumatic suspension system.

6. The complementary suspension device according to claim 5, wherein the second fluid distribution unit comprises two coaxial cylinders of different diameter, connected to one another and closed at their ends, wherein a double piston is arranged in an interior of the two coaxial cylinders, wherein the double piston comprises two pistons integral to a rod thereof, wherein the two pistons are respectively situated in the interior of the two coaxial cylinders thereby delimiting the at least three chambers in the second fluid distribution unit, wherein the piston disposed in the coaxial cylinder with the greater diameter is connected to the elastic means, and wherein the two remaining chambers are connected, respectively, to the first hydro-pneumatic suspension system and the second hydro-pneumatic suspension system.

7. The complementary suspension device according to claim 1,
   wherein the fourth fluid distribution unit is connected in series with the first fluid distribution unit; and
   wherein the third fluid distribution unit is connected in series with the second fluid distribution unit.

8. The complementary suspension system according to claim 7, wherein the third distribution unit comprises the same number of pistons and chambers as the first fluid distribution unit; and
   wherein the fourth fluid distribution unit comprises the same number of pistons and chambers as the second fluid distribution unit.

9. The complementary suspension device according to claims 1 or 7, wherein the first fluid distribution unit comprises:
   at least four chambers; and
   at least one piston;
   wherein each of the at least four chambers are separate, without direct communication of fluid between the at least four chambers, and wherein each of the at least four chambers has a variable volume proportional to a stroke of the at least one piston;
   wherein each of the at least one piston is integrally attached to a connecting rod such that each of the at least one piston displaces simultaneously, so that when an equivalent positive pressure variation occurs at the same time in the first hydro-pneumatic suspension system and the second hydro-pneumatic suspension system the equivalent positive pressure is transferred to a first one of the at least four chambers and a second one of the at least four chambers, and thereby exerts opposing forces on the connecting rod through the at least one piston such that the connecting rod remains motionless, and the first fluid distribution unit thereby behaves rigidly; and wherein the first fluid distribution unit behaves elastically due to a force response exerted by elastic means that act on the at least one piston, when the pressure variations in the first hydro-pneumatic suspension system and the second hydro-pneumatic suspension system are not equivalent.

10. The complementary suspension device according to claim 9, wherein the first fluid distribution unit comprises:

a hydraulic cylinder that has two outer walls and is divided by a third fixed central wall that determines two compartments;

wherein the connecting rod is arranged axially inside the hydraulic cylinder and fitted with two pistons situated respectively in each of the compartments, delimiting two chambers in each of the compartments, thereby defining the at least four chambers made up of two outer chambers and two inner chambers; and wherein the two pistons are in connection with the elastic means; and wherein the two inner chambers are connected to the first hydro-pneumatic suspension system and the second hydro-pneumatic suspension system.

11. The complementary suspension device according to claim 1, the complementary suspension device applicable to a four-wheeled vehicle, wherein two of the first fluid distribution unit, second fluid distribution unit, third fluid distribution unit and fourth fluid distribution unit are in series and configured to be connected to a third hydro-pneumatic suspension system of a third wheel of the four-wheeled vehicle.

12. The complementary suspension device according to claim 11, wherein the first wheel and the second wheel are two transversally opposed vehicle wheels.

13. The complementary suspension device according to claim 11, wherein the third hydro-pneumatic suspension system of the third wheel is connected to the two of the first fluid distribution unit, second fluid distribution unit, third fluid distribution unit and fourth fluid distribution unit hydraulically.

14. The complementary suspension device according to claim 13, wherein the third hydro-pneumatic suspension system and a fourth hydro-pneumatic suspension system of a fourth wheel are connected hydraulically to the first fluid distribution unit and the second fluid distribution unit in parallel.

15. The complementary suspension device according to claim 13, further comprising a fifth fluid distribution unit and a sixth fluid distribution unit connected in parallel between the first hydro-pneumatic suspension system and the second hydro-pneumatic suspension system.

16. The complementary suspension system according to claim 15, wherein the fifth fluid distribution unit and the sixth fluid distribution unit comprise the same number of pistons and chambers as the first fluid distribution unit and the second fluid distribution unit, respectively.

17. The complementary suspension device according to claim 13, wherein the third hydro-pneumatic suspension system and a fourth hydro-pneumatic suspension system of a fourth wheel are connected hydraulically to a fifth fluid distribution unit.

18. The complementary suspension system according to claim 17, wherein the fifth fluid distribution unit comprises the same number of pistons and chambers as the first fluid distribution unit.

19. The complementary suspension system according to claim 17, wherein the fifth fluid distribution unit comprises the same number of pistons and chambers as the second fluid distribution unit.

* * * * *